Nov. 9, 1971   H. SCHOEPE   3,618,427
LOCATING MEANS FOR INDEXING TABLE
Filed Oct. 21, 1969   5 Sheets-Sheet 1

INVENTOR
HARRY SCHOEPE
BY Yount and Tarolli
ATTORNEYS

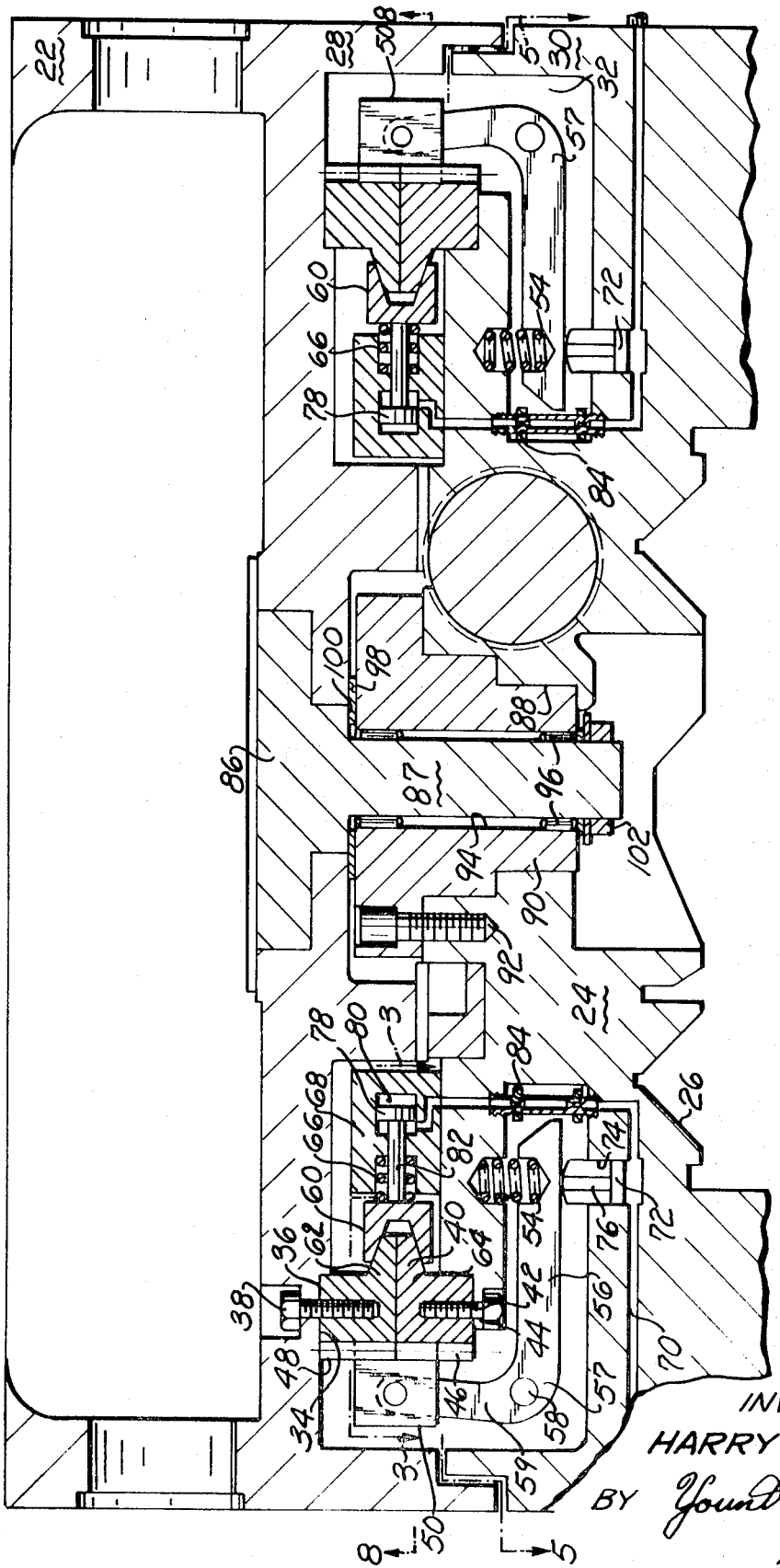

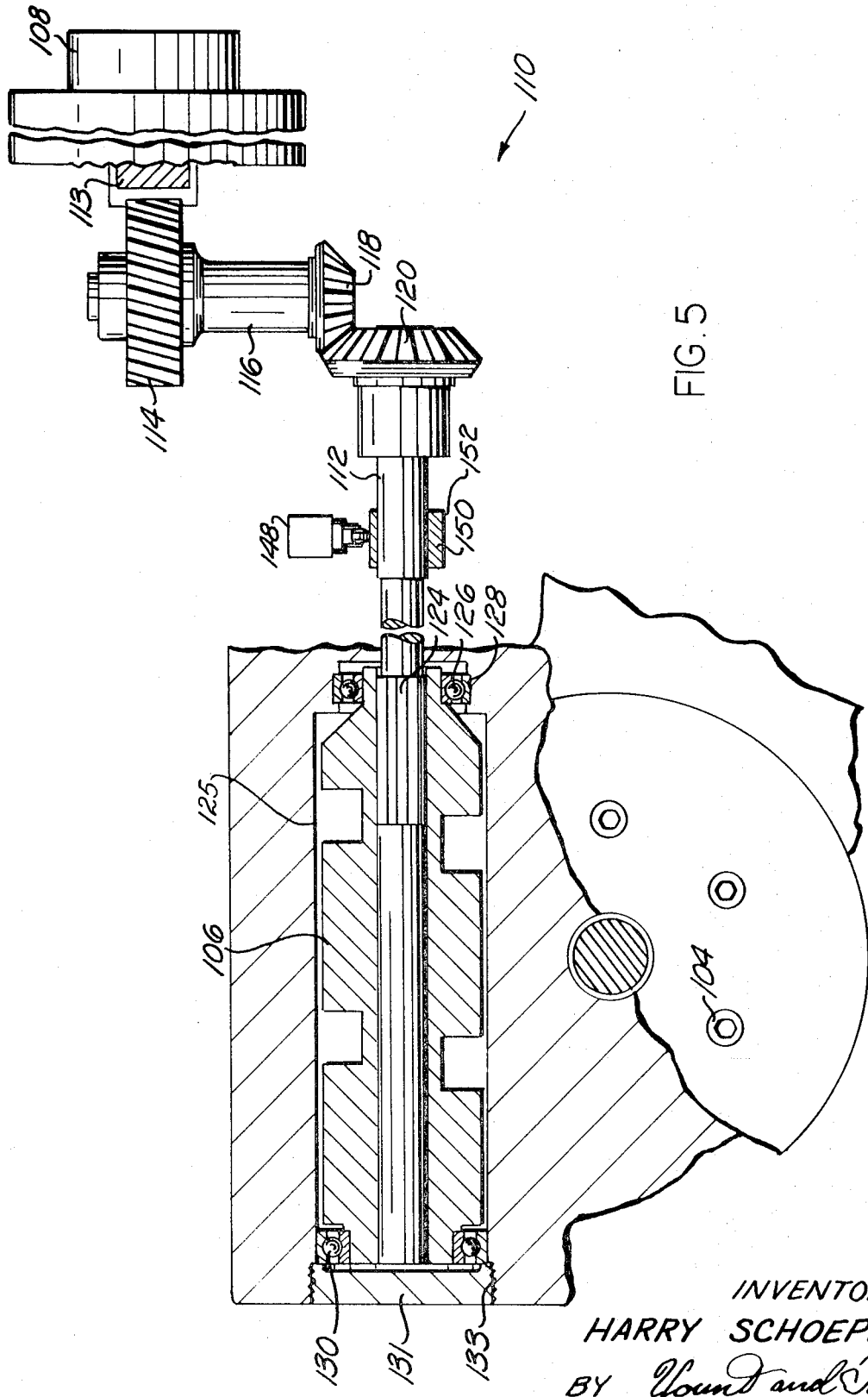

INVENTOR
HARRY SCHOEPE

# United States Patent Office 3,618,427
Patented Nov. 9, 1971

3,618,427
LOCATING MEANS FOR INDEXING TABLE
Harry Schoepe, Cleveland, Ohio, assignor to The Warner & Swasey Company, Cleveland, Ohio
Filed Oct. 21, 1969, Ser. No. 868,112
Int. Cl. B23b 29/32
U.S. Cl. 74—824
23 Claims

ABSTRACT OF THE DISCLOSURE

An improved mechanism for locating and locking a turret of a machine tool which is indexible about an axis of rotation with respect to a slide includes first and second toothed members located on the turret and slide respectively. Located adjacent the first and second toothed members is a third toothed member operable to engage with the first and second members to accurately locate the first toothed member with respect to the second toothed member to thereby accurately position the turret. A locking member is located adjacent the first and second toothed members and operable to engage with and lock the first and second toothed members against relative movement therebetween after the first and second members have been positioned by the third member to thereby lock the turret in position. Rotation, release, positioning and locking of the turret is effected without axial movement of the turret.

---

The present invention relates to a machine tool and more particularly to an improved locating and locking mechanism for positioning an indexible turret about an axis of rotation with respect to a slide and for locking the turret when it reaches a predetermined position.

Known turret indexing and locking mechanisms, such as the one illustrated in the Diener Patent No. 2,940,341, assigned to the assignee of the present invention, disclose a mechanism for indexing and locking a turret of a machine tool. The mechanism includes a pair of toothed coupling elements rigidly affixed to the slide and the turret respectively for locking the turret in an indexed position. In order to index the turret to a new position, the turret must be raised to allow the elements to disengage. This raising movement of the turret allows dust and chips to be sucked into the mechanism which may effect a malfunctioning of the mechanism. Moreover, the raising movement is effected by power means due to the fact that the turret may be a rather weighty object. Since the turret must be raised prior to indexing, such mechanisms do not lend themselves readily to hand indexing since a man is not strong enough to raise the turret.

Accordingly, it is an object of the present invention to provide a new and improved locating and locking mechanism for the turret of a machine tool wherein the hereinabove discussed disadvantages are overcome, and which is constructed so that the turret can be indexed without raising and lowering thereof so that dust and chips are prevented from entering the mechanism and so that the turret may be manually indexed.

Another object of the present invention is to provide a new and improved locating and locking mechanism for the turret of a machine tool having first and second toothed coupling members in an adjacent relationship, a third toothed coupling member operable to cooperate with the first and second coupling members to accurately locate the turret, and a locking member operable to engage with or disengage with the first and second coupling members after the turret has been accurately located to, respectively, lock or unlock the turret.

A further object of the present invention is to provide a new and improved locating and locking mechanism for positioning and locking the turret of a machine tool relative to a slide including a first toothed coupling member rigidly mounted on the slide of the machine tool, a second toothed coupling member located adjacent the first coupling member and rigidly mounted on the turret for rotation therewith, a locking member disposed adjacent the first and second coupling members for simultaneously engaging the first and second coupling members to prevent relative movement therebetween and effectively locking the turret against rotation relative to the slide, and wherein the locking member is disengaged from the first and second coupling members without axial movement of the turret.

A still further object of the present invention is to provide a new and improved locating and locking mechanism, as noted in the next preceding paragraph, futher including a third toothed coupling or positioning member operable to engage with the first and second coupling members to accurately position the second member relative to the first member to thereby accurately position the turret relative to the slide.

Another object of the present invention is to provide a new and improved locating and locking mechanism, as noted in the next preceding paragraph wherein engagement of the third coupling member with the first and second coupling members is effected by movement of the third coupling member which is substantially transverse to the rotation of the turret.

Further objects and advantages of the present invention will be apparent from the following description of a preferred embodiment thereof made with reference to the accompanying drawings forming a part of this specification and wherein:

FIG. 2 is a fragmentary sectional view of the machine tool of FIG. 1 taken approximately along the line 2—2 of FIG. 1 and illustrating the turret locating and locking mechanism;

FIG. 5 is a fragmentary sectional view taken along lines 5—5 of FIG. 2 and showing the indexing control cam drive;

The present invention relates to a locating and locking mechanism providing for accurate positioning of an indexible turret on a machine tool. The mechanism is constructed so that the turret can be released, rotated and locked without raising or lowering thereof. The turret can be indexed manually and dust and chips are not sucked into the turret indexing mechanism. The mechanism can be used with a variety of machine tools and is shown herein for illustrative purposes only as applied to a machine tool 10.

Figure 1:
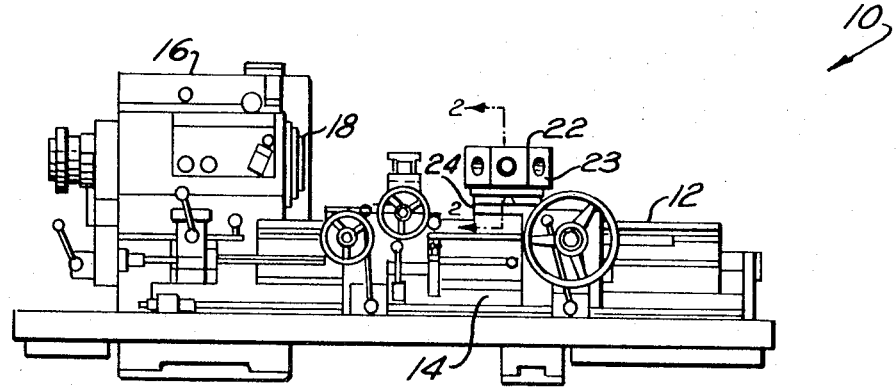
FIG. 1 is a front elevational view of a machine tool having a rotatable turret thereupon embodying the present invention.

The machine tool 10 has a rotatable or indexable turret 22 mounted thereon as shown in FIG. 1. The turret 22 is preferably a hexagonal turret and is mounted upon a slide 24. The slide 24 is mounted on the ways 12 of the machine tool and is guided for movement thereon by the grooves 26 located in the bottom of the slide 24.

The machine tool 10 includes a head portion 16 mounted on one end of the bed 14 of the machine 10. The head portion 16 includes a rotatable spindle 18 for engaging and rotating a workpiece therewith. When the workpiece is mounted in the spindle 18, tools mounted on the indexible turret 22 are adapted to engage therewith to effect a cutting of the workpiece. It should be realized that the turret 22 has a plurality of tool faces 23, each of which has a tool mounted thereon. The turret 22 is then indexed to provide engagement of the different tools with the workpiece.

The bottom side of the turret 22 includes a cavity or recess 32, more fully illustrated in FIG. 2, formed about the central axis of the turret, which is operable to receive a locating and locking mechanism for locating and locking the turret relative to the slide. The cavity 32 is substantially surrounded by an annular skirt 28, which is affixed to the turret 22, and which is adjacent a projection 30 affixed to the slide. The skirt 28 and the projection 30 co-operate to prevent dust and chips from entering the cavity 32 where the locating and locking mechanism is disposed.

Located within the cavity 32 is an annular groove 34 concentrically formed about the central axis of the turret 22 on the bottom thereof. The annular groove 34 is adapted to receive a first toothed coupling member 36 which is secured in the groove 34 to the turret 22 by means of bolts 38 and which rotates when the turret 22 is rotated. A second toothed coupling member 40 is located within an annular groove 42 on the slide 24. The second toothed member 40 is rigidly fastened to the slide 24 by means of the bolts 44 and is inoperable to rotate with the turret 22. The second toothed member 40 is concentric with the central axis of the first toothed member 36 and is disposed adjacent to and below the first toothed member 36. The first and second toothed members 36 and 40 have an annular configuration and respectively include a plurality of teeth 48 and 46 which extend radially from an outer annular surface of each of the members. The plurality of teeth 46 and 48 are operable to be aligned so that the individual teeth on each member are parallel to and immediately below each other when the turret is accurately indexed. It should be realized that when the turret 22 is rotated, the first toothed member 36 rotates relative to the second toothed member 40 which remains stationary because of its rigid attachment to the slide 24. Thus, locating the first toothed member 36 relative to the second toothed member 40 positions the turret 22 relative to the slide 24.

A plurality of rack shoes 50 having teeth 52 are used to accurately locate the turret 22 after it has been indexed. The rack shoes are disposed adjacent to the first and second toothed members 36 and 40 and are operable to engage simultaneously with the teeth 48 and 46 to thereby accurately position the turret relative to the slide. The turret 22 need only be indexed to within a predetermined angular dimension or tolerance of its desired location since meshing of the rack shoe teeth 52 with the teeth 48 of the first toothed members 36 and the teeth 46 of the second toothed member 40 will serve to precisely orientate the turret 22 to its precise desired location by effecting a precise alignment of the teeth 48 of the first rotable toothed member 36 and the teeth 46 of the second rigid toothed member 40. In this manner, mating engagement and accurate relative disposition of the members 36 and 40 will be maintained when the teeth 52 mesh with the teeth 46 and 48 of the coupling members 40 and 36. Thus, if for some reason the turret is not precisely indexed, the meshing of the teeth 52 with the teeth 46 and 48 will effect a minimal rotation of the member 36 and the turret 22 to effect precise indexing thereof.

Figure 3:
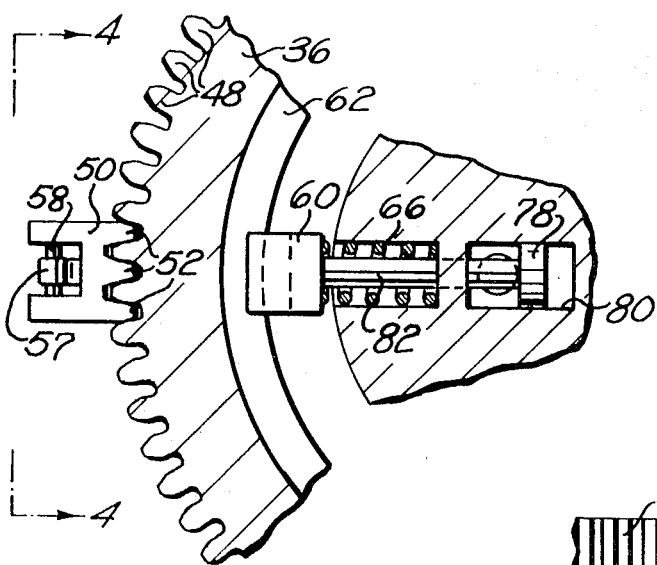
FIG. 3 is a fragmentary sectional view taken along the line 3—3 of FIG. 2 and showing the turret locking mechanism in its locked position.
Figure 4:
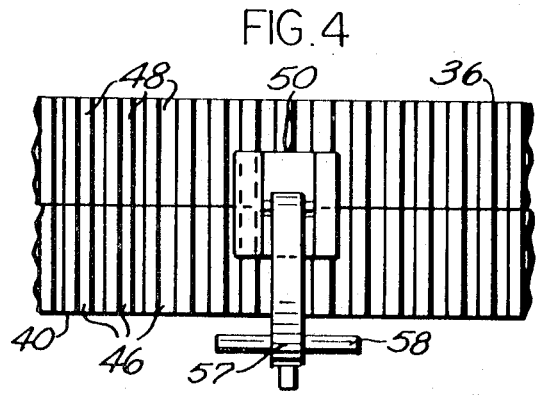
FIG. 4 is a fragmentary sectional view taken approximately along line 4—4 of FIG. 3 and illustrating part of the locking mechanism engaging the first and second toothed coupling members attached to the slide and to the bottom of the turret.
Figure 7:
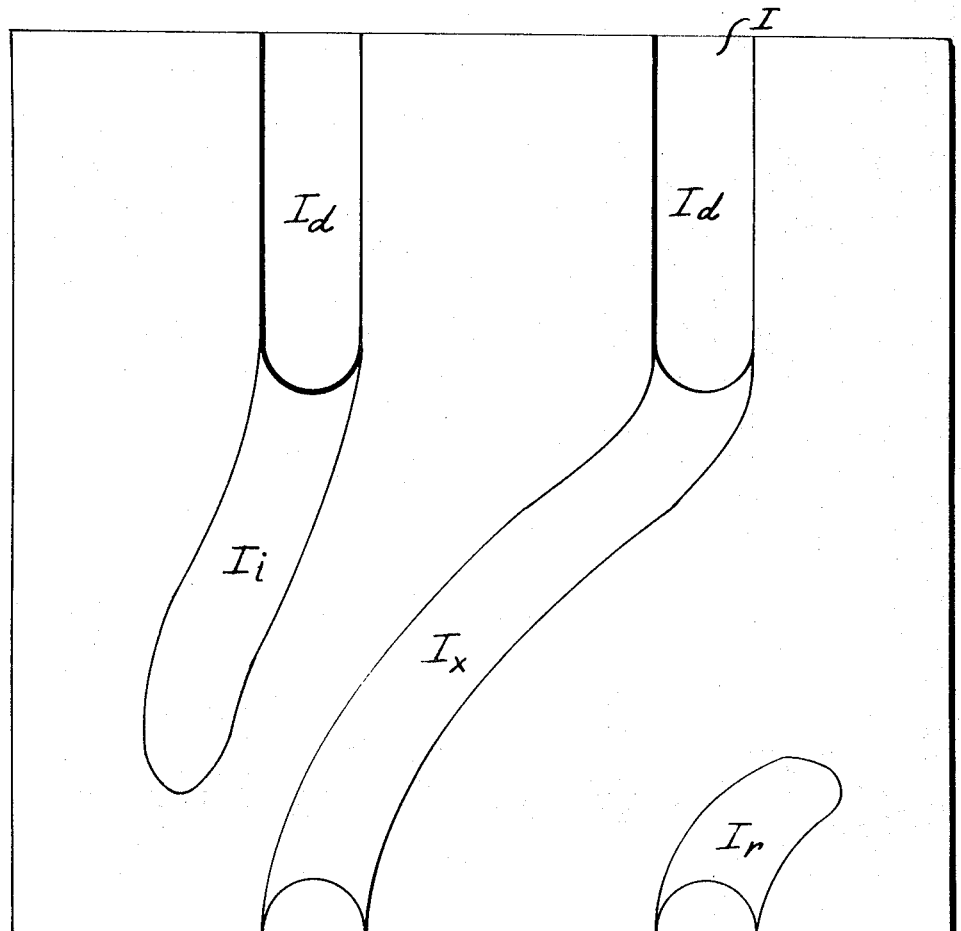
FIG. 7 is a layout of the indexing control cam showing how the cam surfaces are generated in two dimensions.
Figure 6:
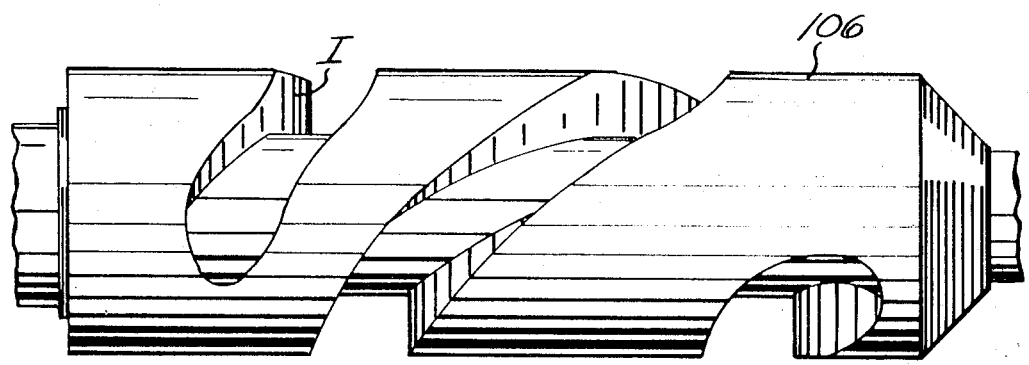
FIG. 6 is an enlarged view of the indexing control cam.

The teeth 52 on the rack shoes 50, as illustrated in FIGS. 2-4, may engage with or disengage with the teeth 48 and 46 of the first and second toothed members 36 and 40 to respectively locate the turret or allow indexing thereof. The teeth 52 on the rack shoes 50 are normally forced into engagement with the teeth of the coupling members 36 and 40 by a spring 54. The spring 54 acts against an arm 56 of a bell crank 57 to rotate the bell crank about a pin or pivot point 58. The rack shoes 50 are mounted on an arm 59 of the bell crank 57 so that the force of the spring 54 urges the rack shoes 50 toward engagement with the first and second toothed members 36 and 40, as shown in FIG. 2. Generally, the rack shoes 50 are in engagement with the first and second toothed members 36 and 40 whenever it is desired to locate and lock the turret in a predetermined position. When it is desired to index the turret 22, the rack shoes 50 must necessarily disengage the toothed members in a manner to be later described to allow relative rotation of the first and second coupling members 36 and 40 and rotation of the turret relative to the slide.

When the rack shoes 50 have engaged with the coupling members 36 and 40 to accurately position the turret 22, the turret is locked into that position. Locking the turret 22 is accomplished when locking means in the form of clamp shoes 60 are brought into simultaneous engagement with annular projections 62 and 64 which are formed on the back side of the first and second toothed member 36 and 40 respectively. The clamp shoes 60 bias the coupling members 36 and 40 into a contiguous relationship so that relative rotation of the first and second coupling members is prevented.

When the turret 22 is locked by means of the clamp shoes 60, a spring 66 acts between the supports 68 and the clamp shoes 60 to urge the clamp shoes 60 into engagement with annular projections 62 and 64. The force of the spring 66 prevents the clamp shoes 60 from disengaging with the projections of the first and second coupling members so that relative rotation therebetween and rotation of the turret is prevented. Moreover, it should be noted that the clamp shoes 60 engage the annular projections 62 and 64 so as to prevent axial movement of the turret 22 relative to the slide 24. This is extremely important as when a tool in the turret engages with a rotating workpiece, the rotating motion of the workpiece might tend to impart a lifting movement to the turret. However, any axial motion that is imparted to the turret will be opposed by the force of the clamp shoes 60 and axial movement of the turret will be prevented.

A hydraulic system is utilized to move the rack shoes 50 and the clamp shoes 60 to their disengaged position against the force of the springs 54 and 66 respectively so that the turret can be rotated. To this end, a hydraulic line 70 is provided which communicates with a piston 72 attached to the arm 56 of the bell crank 57 and a piston 78 attached to the clamp shoes 60. When hydraulic fluid is introduced to the line 70, the fluid pressure acts against the piston 72 in the cylinder 74 to move the piston 72 upwardly. The piston 72 is connected with the piston rod 76 which is engaged with the arm 56 of the bell crank 57. Upward movement of the piston 72 causes the piston rod 76 to overcome the force of the spring 54 so that the arm 56 moves upwardly and the bell crank 57 is rotated to thereby disengage the teeth 52 of the rack shoes 50 from the teeth 58 and 46 of the first and second toothed members 36 and 40. The fluid pressure in the hydraulic line 70 also acts on the piston 78 in the cylinder 80 to effect movement of the piston 78 inwardly of the cylinder 80. Inward movement of the piston 80 causes the piston rod 82 which is attached thereto to move inwardly of the cylinder 80. The piston rod 82 is attached to the clamp shoes 60 so that inward movement of piston 78 overcomes the force of the spring 66 and moves the clamp shoes 60 out of engagement with the annular projections 62 and 64. Thus, when hydraulic fluid is introduced into the line 70, the rack shoes 50 and the clamp shoes 60 disengage with the coupling members 36 and 40 to provide for relative rotation of the coupling members 36 and 40 and rotation of the turret relative to the slide.

When it is desired to have the rack shoes 50 and the clamp shoes 60 engage with the first and second toothed members 36 and 40, the fluid pressure in the line 70 is allowed to drop. This allows the springs 54 and 66 to have the rack shoes 50 and the clamp shoes 60 transverse to the axis of rotation of the turret to effect engagement of the rack shoes 50 and the clamp shoes 60 with the members 36 and 40, to thereby respectively locate and lock the turret 22.

It is desirable that the rack shoes 50 engage with the first and second toothed members 36 and 40 before the clamp shoes 60 therewith so that the turret 22 can be accurately located by means of the rack shoes 50 before it is locked by means of the clamp shoes 60. To this end, restricting orifices 84 are placed in the line 70 between the cylinders 74 in which the piston 72 acts to move the rack shoes 50 and the cylinders 80 in which the piston 78 acts to move the clamp shoes 60. The restricting orifices 84 cause the fluid pressure in the clamp shoe cylinders 80 to drop at a lesser rate than the fluid pressure in the rack shoe cylinders 74 when the pressure in line 70 is allowed to drop. Since the fluid pressure in the rack shoe cylinders 74 drops faster than the fluid pressure in the clamp shoe cylinders 80, the force of the spring 54 will act to move the rack shoes 50 into engagement with the coupling members 36 and 40 before the force of the spring 66 moves the clamp shoes 60 into engagement therewith. This will cause the teeth 52 of the rack shoes 50 to engage the teeth 48 and 46 of the first and second toothed members 36 and 40 before the clamp shoes 60 engage the annular projections 62 and 64 of the first and second toothed members 36 and 40. As a result, the turret 22 will be sequentially located relative to the slide 24 by the rack shoes 50 and then locked into this location by the clamp shoes 60.

It should be realized that the same result could be accomplished without using the restricting orifice 84 by making the springs 54 exert more force than is exerted by the springs 66. In this type of embodiment the spring 54 would overcome the fluid pressure in line 70 and move the rack shoe 50 into engagement with the members 36 and 40 prior to the time when the spring 66 overcome the pressure in line 70 to move the clamp shoes 60 into engagement with the members 36 and 40.

After the rack shoes 50 and the clamp shoes 60 are moved out of engagement with the first and second toothed members 36 and 40, the turret 22 and the first toothed member 36 affixed thereto can be rotated.

The turret 22 is attached to the slide 24 by means of a plug 86 which is rigidly affixed to the bottom of the turret 22. The slide 24 has a recess 88 formed therein which has a stepped configuration. A sleeve 90 is located within the recess and is secured to the slide 24 by means of bolts 92. The sleeve 90 has an axial bore 94 which receives an axially extending portion 87 of the plug 86 for rotation therein.

Interposed between the axially extending portion 87 of the plug 86 and the sleeve 90 are axially extending needle bearings 96. Additional needle bearings 98 of the flat radial type are located between the top of sleeve 90 and the radial shoulder 100 of the plug 86. The needle bearings 96 and 98 permit the plug 86 and the turret 22 affixed thereto to be journaled within the sleeve 90 with a minimum of friction. A nut 102 is placed upon the end of the axially extending portion 87 of the plug 86 to secure the plug 86 and the turret 22 affixed thereto against axial movement relative to the slide 24.

Figure 8:
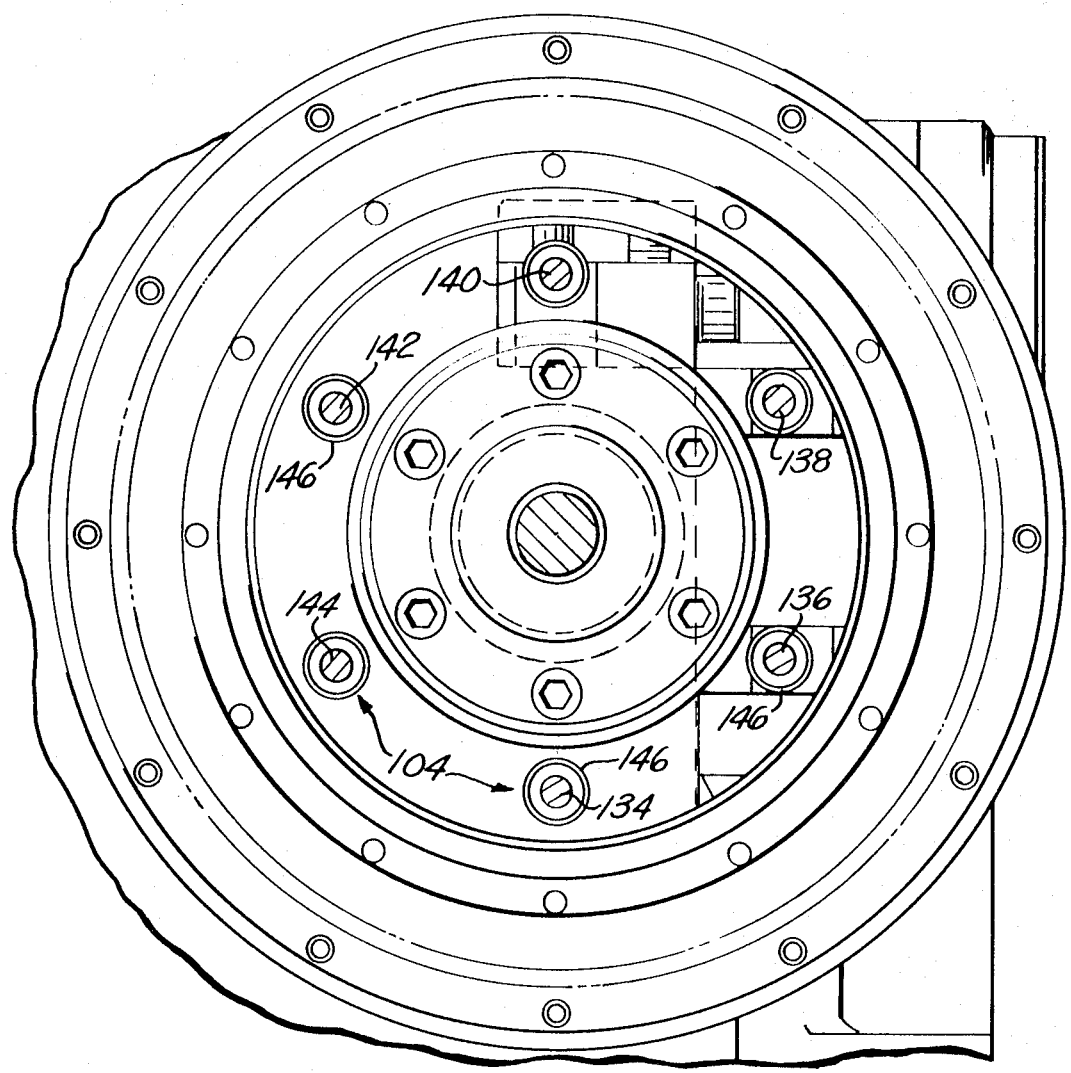
FIG. 8 is a top plan view of the automotive indexing turret with the turret head removed, as viewed along lines 8—8 of FIG. 2.

A plurality of cam followers 104 are affixed to the bottom of the turret 22 as shown in FIG. 8. The cam followers 104 serve to rotate the turret 22 when they are rotated by means of cam 106. The cam 106 is rotated by means of reversible electric motor 108 and a reduction gear mechanism 110 communicating with the motor 108 and the control cam 106. The motor 108 includes a drive shaft 113 which rotates a worm gear, not shown. The worm gear engages with and effects rotation of a worm wheel 114 which is rigidly affixed on one end of the shaft 116. The other end of the shaft 116 has a bevel gear 118 mounted thereon, which meshes with a similarly beveled gear 120. The bevel gear 120 is rigidly affixed to the shaft 112 which has a spline portion 124 on its opposite end which is disposed internally of the control cam 106. The splined end 124 suitably engages reciprocal splines located in a passageway 125 disposed concentrically along the longitudinal axis of the control cam 106.

Suitable ball bearings 126 disposed in recesses 128 formed in the slide 24 suitably journal the shaft 112 into the control cam 106. The opposite end of the control cam 106 is likewise suitably journaled within the cylindrical bore 125 in which the cam is located by ball bearings 130 which serve to rotatably mount the other end of the cam 106. The cylindrical bore 125 in which the cam is mounted is suitably closed at the opposite end by closure member 131 which is threaded into the outer end 133 of the cylindrical bore 125.

Cam 106 is provided with an indexing cam surface or groove of an open circuit type comprising a run-in portion $I_i$, a dwell portion $I_d$, and indexing portion $I_x$, another dwell portion $I_d$ and a run-out portion $I_r$. The indexing cam surface or groove I engages with the plurality of cam followers 104 provided on the under surface of the turret 22 as shown in FIG. 8. The cam followers 104 consist of six equal-angularly spaced indexing cam followers 134, 136, 138, 140, 142 and 144. The cam followers 104 are each provided with a roller portion 146 which is received in the indexing groove I of the cam 106, with the cam followers 104 being secured to the turret 22 by means of threaded shanks integral therewith. It should be apparent that rotation of the cam 106 will effect a rotation of the turret by movement of the cam followers 104 through the cam groove I.

When it is desired to rotate the hexagonal turret 22 the pressure in line 70 is raised to disengage the rack shoes 50 and the clamp shoes 60 with the toothed members 36 and 40. The electric motor 108 is then energized to effect rotation of the cam 106 through the reduction gear mechanism 110. The cam 106 operates to rotate the cam followers 104, which are fixed upon the lower portion of the turret 22. After the turret 22 has been indexed the pressure in the line 70 is allowed to drop, causing the teeth 52 of the rack shoes 50 to accurately locate the turret 22 by engaging the teeth 48 and 46 of the first and second toothed members 36 and 40. After the rack shoes 50 engage with the first and second members 36 and 40, the clamp shoes 60 move to lock the turret 22 by engaging the annular projections 62 and 64 which are formed on the backside of the first and second toothed members 36 and 40. Thus, it should be realized that the turret 22 is indexed, located and locked without being raised, and that dust and chips are not sucked into the indexing, locating and locking mechanism.

Referring to FIG. 5, a limit switch 148 may be provided adjacent to a cam 150 having a cam lobe 152 thereon which is attached to the shaft 112 in the reduction gear mechanism 110. The switch 148 may ride on the cam 150 and be used to electrically brake the motor 108 when the turret is indexed from one working position to the next successive working position. It should be apparent that every complete rotation of the cam 106 will effect rotation of the turret 22 from one work position to another. Thus, during each single rotation of cam 106, the shaft 112 will rotate and the lobe 152 of cam 150 will energize the switch 148 to brake the motor 108. Therefore, when it is desired to index the turret 22, the operator of the machine tool 10 will energize the motor 108. When the motor 108 indexes the turret to its next work station, the motor 108 will be automatically stopped by the switch 148 as the cam lobe 152 activates the switch and the turret 22 will be locked into position. Moreover, suitable override controls may be provided if it is desired to index the turret 22 to a work position other than the next successive work position.

While power means have been illustrated and described to index and lock the turret 22 it should be realized that the turret could easily be indexed by hand. To this end, means could be provided to manually rotate the turret 22. This is easily accomplished due to the fact that the turret 22 need only be rotated and need not be raised to effect rotation thereof. This presents a distinct advantage over the prior art in that unlocking of the turret previously required raising the turret. Since the turret may weigh many hundreds of pounds, this could not be done by hand. Also, due to the fact that the turret 22 need not be raised the time for indexing and locking the turret may be substantially reduced regardless of whether the indexing is accomplished by power means or by hand. The fact that indexing of the turret does not require vertical movement of the turret allows the turret to be indexed by relatively small forces. This is a great improvement over the prior art in that indexing of large turrets regardless of their weight may now be accomplished by hand in a relatively short time span.

It should be apparent that the annular skirt 28 cooperates with the projection 30 on the slide 24 to prevent dust and chips from entering the cavity 32 where the locating and locking mechanism is located. The annular skirt 28 and the projection 30 which is disposed adjacent thereto form a barrier to prevent dust and chips from entering the cavity 32.

Having described my invention, I claim;

1. A mechanism for accurately positioning an indexible turret with respect to a slide comprising a coupling mechanism operatively associated with the turret and the slide for accurately positioning the turret relative to the slide, said coupling mechanism comprising first and second coupling members carried on the turret and the slide, respectively, at least one third coupling member movable between a first position in which it is engaged with said first and second coupling members and a second position in which it is disengaged from said first and second coupling members, said third coupling member cooperating with said first and second coupling members upon movement from said disengaged position to said engaged position to effect an accurate positioning of the turret relative to the slide, and means for moving said third coupling member relative to the turret between said engaged position and said disengaged position, said means for moving said third coupling member between said engaged position and said disengaged position includes a bell crank member upon which said third coupling member is mounted and spring means associated with said bell crank member for biasing said third coupling member into said engaged position and fluid means operatively connected with said bell crank member for moving said third coupling member against the bias of said spring means to said disengaged position.

2. A mechanism as defined in claim 1 wherein movement of said third coupling member from said engaged position to said disengaged position is in a general direction transverse to the direction of rotation of the turret.

3. A mechanism for accurately positioning an indexible turret with respect to a slide comprising a coupling mechanism operatively associated with the turret and the slide for accurately positioning the turret relative to the slide, said coupling mechanism comprising first and second coupling members carried on the turret and the slide, respectively, at least one third coupling member movable between a first position in which it is engaged with said first and second coupling members and a second position in which it is disengaged from said first and second coupling members, said third coupling member cooperating with said first and second coupling members upon movement from said disengaged position to said engaged position to effect an accurate positioning of the turret relative to the slide, means for moving said third coupling member relative to the turret between said engaged position and said disengaged position, a fourth member movable between a first position in which it clamps said first and second coupling members together and a second position in which it is disengaged with said first and second coupling members, and means for moving said fourth member relative to the turret between said first and second positions.

4. A mechanism as defined in claim 3 wherein said means for moving said fourth member between said first and second positions includes spring means for biasing said fourth member to said first position and fluid means for moving said fourth member against the bias of said spring means to said second position.

5. A mechanism as defined in claim 4 wherein said fourth member is operable to lock the turret against rotation relative to the slide after the turret has been accurately positioned by the cooperative action of said first, second, and third members.

6. A mechanism for accurately positioning an indexible turret with respect to a slide comprising a coupling mechanism operatively associated with the turret and the slide for accurately positioning the turret relative to the slide, said coupling mechanism comprising first and second coupling members carried on the turret and the slide, respectively, at least one third coupling member movable between a first position in which it is engaged with said first and second coupling members and a second position in which it is disengaged from said first and second coupling members, said third coupling member cooperating with said first and second coupling members upon movement from said disengaged position to said engaged position to effect an accurate positioning of the turret relative to the slide, and means for moving said third coupling member relative to the turret between said engaged position and said disengaged position, said first and second members being arcuate toothed members disposed concentric to the axis of rotation of the turret, and said third member being an arcuate toothed member, the teeth of said first, second, and third members cooperating to effect accurate positioning of the turret.

7. A mechanism for accurately positioning an indexible turret with respect to a slide comprising a coupling mechanism operatively associated with the turret and the slide for accurately positioning the turret relative to the slide, said coupling mechanism comprising first and second coupling members carried on the turret and the slide, respectively, at least one third coupling member movable between a first position in which it is engaged with said first and second coupling members and a second position in which it is disengaged from said first and second coupling members, said third coupling member cooperating with said first and second coupling members upon movement from said disengaged position to said engaged position to effect an accurate positioning of the turret relative to the slide, means for moving said third coupling member relative to the turret between said engaged position and said disengaged position, and a fourth member movable to a first position in which it clamps said first and second members together to lock the turret against movement relative to the slide after said third member has positioned the turret and a second position in which it is disengaged from said first and second member and which enables the turret to move relative to the slide.

8. A mechanism as defined in claim 7 wherein said first member is rigidly affixed to the turret and is rotatable therewith, said second member is rigidly affixed to the slide and said third and fourth members are movable generally radially relative to the turret to engage and disengage with said first and second members.

9. A mechanism for positioning an indexible turret with respect to a slide comprising first and second annular toothed members disposed concentric to the axis of rotation of the turret with said first member carried by the bottom side of the turret and said second member carried by the upper side of the slide, a third member movable into and out of engagement with said first and second toothed members, said third member having means for engaging the teeth of said first and second members to effect relative movement thereof and thereby accurately locate the turret with respect to the slide upon movement of the third member into engagement with the first and second members.

10. A mechanism as defined in claim 9 wherein said first member is rigidly affixed to the bottom of the turret, said second member is rigidly affixed to the slide, and said third member is movable in a direction transverse to the axis of the turret to engage and disengage with said first and second members.

11. A mechanism as defined in claim 9 further including a fourth member engageable with said first and second members to lock the turret against rotation relative to the slide.

12. A mechanism as defined in claim 9 wherein said first and second members include a plurality of radially extending teeth disposed on an outer annular surface thereof and said means for engaging the teeth of said first and second members includes a plurality of teeth located on said third member and which co-operate with the teeth on the first and second members to thereby accurately locate said first member and the turret relative to the slide when said teeth of said third member engage with said teeth of said first and second members.

13. A mechanism as defined in claim 11 wherein said first and second members further include annular projections disposed thereon and wherein said fourth member simultaneously engages with said annular projections after the turret has been located to thereby prevent relative movement of said first and second members and lock the turret in a predetermined position.

14. A mechanism for locating and locking a turret mounted on a slide, comprising a first annular member disposed concentric to the axis of rotation of the turret and carried by the bottom side of the turret, a second annular member disposed concentric to the axis of rotation of said turret and carried by the upper side of the slide, a plurality of third members having means for engaging said first and second members to locate the turret, and a plurality of fourth members having means for engaging said first and second members to lock the turret against movement relative to the slide after said third elements have located the turret.

15. A mechanism as defined in claim 14 wherein said first and second members have a plurality of teeth extending radially therefrom on an outer surface thereof and an internal projection extending in a direction opposite to which said teeth extend.

16. A mechanism as defined in claim 15 wherein said third member includes a rack shoe operable to simultaneously engage with said external teeth of said first and second members to thereby locate the turret with respect to the slide, and said fourth member includes a clamp shoe for simultaneously engaging with said internal projections of said first and second members to thereby lock the turret relative to the slide.

17. A mechanism as defined in claim 16 further including first spring means for biasing said rack shoes into engagement with said teeth of said first and second members, second spring means for biasing said clamp shoes into engagement with said internal projections of said first and second members, first fluid means actuatable to move said rack shoes out of engagement with said first and second members against the force of said first spring means, second fluid means actuatable to move said clamping shoes out of engagement with said internal projections of said first and second members against the face of said second spring means and wherein deactuation of said first and second fluid means allows said rack shoes and said clamp shoes to move into engagement with said first and second members under the influence of said first and second spring means respectively.

18. A mechanism as defined in claim 17 further including means for sequentially moving said clamp shoes into engagement with said internal projections of said first and second members after said rack shoes move into engagement with said first and second members so that the turret is locked relative to the slide after it is located by engagement of said rack shoes with said first and second members.

19. A mechanism as defined in claim 18 wherein said means for sequentially moving said clamp shoes and said rack shoes includes flow restrictive devices interposed between said first and second fluid means for moving said rack shoes and said clamp shoes.

20. A mechanism for positioning an indexible turret with respect to a slide, said mechanism comprising a first locating element connected to the slide and including a first circular array of teeth, a second locating element connected to the turret and including a second circular array of teeth disposed in a concentric relationship with an axis of rotation of the turret and with said first circular array of teeth, and a third locating element associated with said first and second circular arrays of teeth, said third locating element including tooth means for meshing engagement with at least a portion of said first and second circular arrays of teeth to position the turret in a selectable predetermined position with the slide.

21. A mechanism as set forth in claim 20 wherein said tooth means includes at least one tooth which meshingly engages teeth in both said first and second circular arrays of teeth to locate the turret in the selected predetermined position with respect to the slide.

22. A mechanism as set forth in claim 20 further including means for releasing the turret for rotational movement relative to the slide without moving the turret along its axis of rotation relative to the slide including means for moving said tooth means out of engagement with said first and second circular arrays of teeth.

23. A mechanism for positioning an indexible turret with respect to a slide comprising a coupling mechanism operatively associated with the turret and the slide for locating the turret in a position to which it is rotated, said coupling mechanism comprising first and second toothed coupling members carried on the slide and turret respectively and a third toothed coupling member movable between a first position in which its teeth are engaged with said first and second coupling members and a second position in which its teeth are disengaged from said first and second coupling members, said first, second, and third coupling members having teeth which cooperate during movement of said third coupling member into engagement with said first and second coupling members to position the turret relative to the slide, and means for releasing the turret for rotation without axial movement of the turret and including means for moving said third coupling member relative to the turret from said engaged position to said disengaged position.

References Cited
UNITED STATES PATENTS

| | | | |
|---|---|---|---|
| 2,659,960 | 11/1953 | Johnson | 74—813 L |
| 2,949,796 | 8/1960 | Frederick et al. | 74—817 X |
| 2,979,971 | 4/1961 | Darash | 74—826 X |

WILLIAM F. O'DEA, Primary Examiner

F. D. SHOEMAKER, Assistant Examiner

U.S. Cl. X.R.

74—813 L, 827